(12) United States Patent
Nack

(10) Patent No.: US 7,386,471 B1
(45) Date of Patent: Jun. 10, 2008

(54) METHOD AND SYSTEM FOR MANAGING A CONSUMER TRANSACTION SYSTEM WITH A MOBILE MANAGEMENT DEVICE

(75) Inventor: Christopher Joel Nack, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1302 days.

(21) Appl. No.: 09/261,030

(22) Filed: Mar. 2, 1999

(51) Int. Cl.
*G06Q 1/12* (2006.01)
*G06Q 20/00* (2006.01)

(52) U.S. Cl. .......................................... 705/21; 705/16
(58) Field of Classification Search ................ 705/21, 705/15, 16; 235/383
See application file for complete search history.

(56) References Cited

U.S. PATENT DOCUMENTS

| | | | |
|---|---|---|---|
| 3,697,693 A | 10/1972 | Deschenes et al. | 179/2 DP |
| 3,863,245 A | 1/1975 | Swinamer et al. | 340/286 |
| 4,903,200 A | 2/1990 | Mook, Jr. | 364/405 |
| 5,128,862 A | 7/1992 | Mueller | 364/405 |
| 5,256,863 A | 10/1993 | Ferguson et al. | 235/383 |
| 5,310,997 A | 5/1994 | Roach et al. | 235/375 |
| 5,721,536 A | 2/1998 | Mulqueen | 340/825.3 |
| 6,138,105 A * | 10/2000 | Walker et al. | 705/10 |

FOREIGN PATENT DOCUMENTS

JP        6-217370    *    1/1993

OTHER PUBLICATIONS

Nation's Restaurant News, v32n44 pp. 47 Nov. 2, 1998.*
Business Wire, p06160247, Jun. 16, 1998.*

\* cited by examiner

*Primary Examiner*—Michael Cuff
(74) *Attorney, Agent, or Firm*—Sawyer Law Group LLP

(57) ABSTRACT

Method and system aspects for providing efficient management interaction in a consumer transaction system are described. The system includes a plurality of point of sale (POS) systems, a central controller system coupled to the plurality of POS systems, and a mobile manager system. The mobile manager system communicates with the plurality of POS systems through the central controller system by a wireless communication mechanism and remotely monitors and responds to the plurality of POS systems.

14 Claims, 2 Drawing Sheets

METHOD AND SYSTEM FOR MANAGING A CONSUMER TRANSACTION SYSTEM WITH A MOBILE MANAGEMENT DEVICE

FIELD OF THE INVENTION

The present invention relates generally to a consumer transaction system and more particularly to the efficient management of point of sale (POS) devices in a consumer transaction system through a mobile management device.

BACKGROUND OF THE INVENTION

Consumer demand for fast and efficient customer service has steadily increased with the wide-spread utilization of computerized systems for processing customer sales and transactions. As demand is met, expectation levels rise, so that problems that occur with these point of sale (POS) systems cause annoyance and frustration to customers. Dissatisfied customers are a significant concern for any consumer-oriented business.

One particular problem associated with POS systems is the need for manager intervention under various circumstances, such as an override situation. These situations normally arise during a transaction when some limit or store policy is exceeded. Unfortunately, during such situations, the POS application does not allow the cashier to complete the operation without getting a manager's approval and merely informs the user what limit was exceeded with a request that a manager's override be performed. In most stores, this means the cashier will call for a manager to come to the register and either use a manager's key or type in a manager's override code, which causes a delay in the checkout process.

Accordingly, a need exists for a more efficient and productive manner of achieving manager interaction with POS systems. The present invention addresses such a need.

SUMMARY OF THE INVENTION

The present invention provides for efficiently handling an override condition in a point of sale device (POS). In a method aspect, the method includes receiving override details at the POS device, and sending the override detail from the POS device to a wireless management device. A personal digital assistant with a wireless modem is utilized as the wireless management device.

In a further aspect, a method and system provides efficient management interaction in a consumer transaction system. The system includes a plurality of point of sale (POS) systems, a central controller system coupled to the plurality of POS systems, and a mobile manager system. The mobile manager system communicates with the plurality of POS systems through the central controller system by a wireless communication mechanism and remotely monitors and responds to the plurality of POS systems.

Through the present invention, more efficient management of POS devices is achieved. The advantages of the aspects of the present invention will be more fully understood in conjunction with the following detailed description and accompanying drawings.

DETAILED DESCRIPTION OF THE INVENTION

The present invention relates to utilization of a mobile management device to increase the efficiency of manager interactions with POS devices in a consumer transaction system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
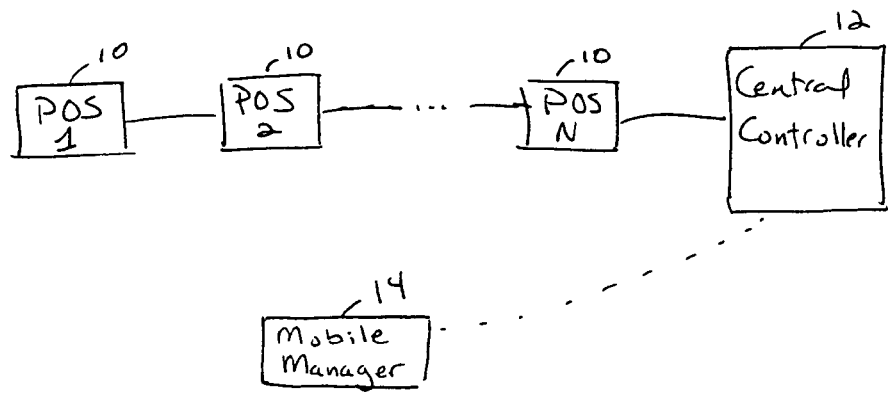
FIG. 1 illustrates a block diagram of a system for improving manager interaction in a consumer transaction system in accordance with the present invention.

FIG. 1 illustrates a block diagram of a system for improving manager interaction in a consumer transaction system. For illustrative purposes, a grocery store and bank are two examples of customer-oriented environments which utilize computerized systems that are referred to herein as consumer transaction systems. As shown in FIG. 1, the system includes a plurality of POS systems 10, such as a set of registers in a grocery store. The POS systems 10 are coupled to a central controller system 12 in a local area network (LAN) configuration. An IBM 4690 store controller, IBM AS400 system, or a regular personal computer such as a Pentium based system are examples of systems suitable for use as the central controller system 12. In accordance with the present invention, the system further includes a mobile manager system 14, such as a pen-based, personal digital assistant device, e.g., a PalmPilot device from 3Com Corporation of Santa Clara, Calif., equipped for remote use via a wireless modem. The mobile manager system 14 provides an interface to the consumer transaction system by a person working as a manager of the system for remotely accessing and monitoring the transaction system.

Figure 2:
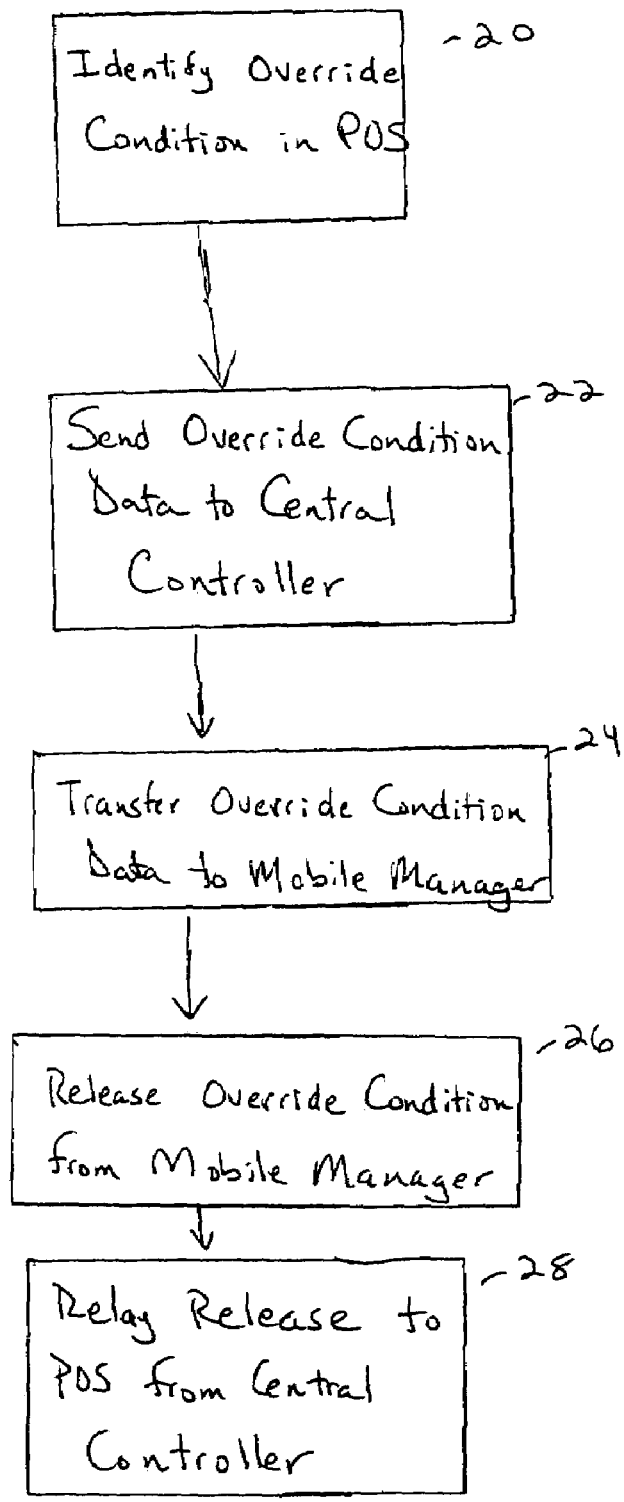
FIG. 2 illustrates a block flow diagram of a method to provide efficient management of the consumer transaction system of FIG. 1 during an override situation in accordance with the present invention.

A method for utilizing the mobile manager system 14 to provide efficient management of the consumer transaction system during an override in accordance with the present invention is illustrated in the block flow diagram of FIG. 2. The method initiates with identification of an override condition in a POS system 10 (step 20), such as through the display of a prompt on a display screen of the POS system. Substantially simultaneously, the data relevant to the override condition is then sent to the central controller 12 (step 22). The central controller 12 signals the occurrence of the override condition to the mobile manager 14 and transfers the override condition data to the mobile manager 14 (step 24). By way of example, the override condition data may include the name or number of the POS system having the problem, the name of the person working at that POS system, and the specifics of the override condition, e.g., the transaction amount that exceeds a limit. The mobile manager 14 then is used to provide the appropriate action, such as through selection of an override release command by the manager, which is signaled to the central controller 12 (step 26). The central controller 12 relays the override release signal from the mobile manager 14 to the POS system 10 (step 28), and thus, the override condition is handled in less time than that normally associated with direct, physical interaction by a manager with the POS device 10.

Figure 3:
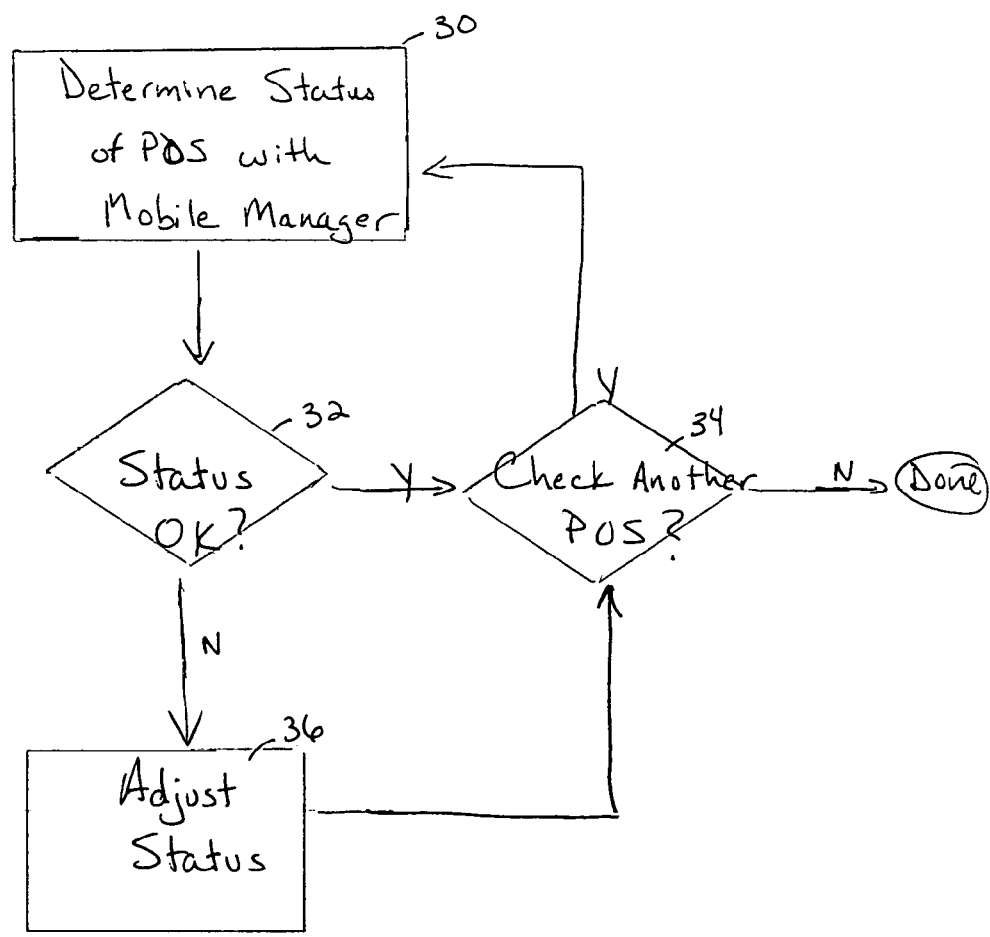
FIG. 3 illustrates a block flow diagram of a method for performing remote monitoring when managing the consumer transaction system in accordance with the present invention.

In addition to remotely handling an override situation, in accordance with another aspect of the present invention, the mobile manager 14 is utilized to monitor the status of the POS systems 10 remotely, as described with reference to the block flow diagram of FIG. 3. The monitoring initiates with the occurrence of a status determination for a POS system 10 by the mobile manager 14 (step 30). For example, the manager accesses the mobile manager system 14 and selects a POS system to monitor. Monitoring of the status includes receiving information about the POS system, such as whether the POS system was opened/closed, who is signed-on to the POS system, whether a cash drawer for the POS system requires a tender pick-up, etc. In addition to these types of status data, operator statistics may also be remotely monitored, including scan rate and transaction rate. When the status is found to be satisfactory, as determined via step 32, the process continues with a determination of whether another POS system is to be checked, via step 34. If another POS system is to be checked, the process continues with a status determination for that POS system, i.e., returns to step 30. If no other POS system is to be checked, the process is completed.

When the status is determined to be unsatisfactory, i.e., step 32 is negative, the status of the POS system is adjusted (step 36). When possible, the necessary status adjustments are achieved remotely via the mobile manager system 14. For example, in the case of an unlocked system that requires locking, preferably the mobile manager system 14 sends a lock command signal that identifies the POS system to be locked to the central controller 12. The central controller 12 then proceeds to perform and confirm the locking of that POS system. Other adjustments may require direct human intervention, such as when a tender pick-up is necessary, in which case the status is adjusted by removing the excessive money from the POS system. The mobile manager 14 could also be used to remotely provide price information to a POS system 10 in a price check situation.

Through the present invention, a straightforward approach to improving a consumer transaction system is provided. The ability to remotely access a POS system through the aspects of the present invention reduces delay normally associated with manager interactions with a POS system. In addition, better monitoring of POS system status is also achieved, which further improves the efficiency of system operation.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for efficiently handling an override condition in a point of sale device (POS), the method comprising:
    (a) receiving override details at the POS device;
    (b) sending the override details from the POS device to a wireless management device; and
    (c) displaying the override details on the wireless management device, further including:
        entering an override signal on the wireless management device;
        sending the override signal to a central controller device from the wireless management device; and
        relaying the override signal from the central controller device to the POS device.

2. The method of claim 1 wherein the sending step (b) comprises
    (b1) providing the override details from the POS device to a central controller device; and
    (b2) sending the override details from the central controller device to the wireless management device.

3. The method of claim 1 in which the wireless management device comprises a personal digital assistant (PDA), the PDA including a wireless modem.

4. A method for providing efficient management interaction in a consumer transaction system, the method comprising:
    (a) performing customer transactions through a plurality of point of sale (POS) systems networked to a central controller system, including identifying an override condition during a customer transaction in a POS system, sending data for the override condition to the central controller system, and transferring the data for the override condition to a mobile manager system; and
    (b) utilizing the mobile manager system to remotely monitor and respond to the plurality of POS systems, including signaling release of the override condition from the mobile manager system to the central controller system.

5. The method of claim 4 further comprising relaying the release of the override condition from the central controller to the POS system.

6. The method of claim 4 wherein utilizing step (b) further comprises (b1) utilizing a personal digital assistant equipped with a wireless modem.

7. The method of claim 6 wherein utilizing step (b1) further comprises determining a status of at least one of the plurality of POS systems, identifying whether the status is satisfactory, and when the status is unsatisfactory, adjusting the status to reach a satisfactory level.

8. The method of claim 7 wherein adjusting the status further comprises remotely switching a status for a lock of the at least one POS system.

9. The method of claim 7 wherein adjusting the status further comprises directly tendering a monetary pick-up from the at least one POS system.

10. A system for improving manager interaction in a consumer transaction system, the system comprising:
    a plurality of point of sale (POS) systems;
    a central controller system coupled to the plurality of POS systems; and
    a mobile manager system in communication with the plurality of POS systems through the central controller system by a wireless communication mechanism, wherein the mobile manager system remotely monitors and responds to the plurality of POS systems, the POS system identifies an override condition during a customer transaction and sends data for the override condition to the central controller system, the central controller system transfers the data for the override condition to the mobile manager system, and the mobile manager system signals release of the override condition to the central controller system.

11. The system of claim 10 wherein the central controller system relays the release of the override condition to the POS system.

12. The system of claim 10 wherein the mobile manager system comprises a personal digital assistant equipped with a wireless modem.

13. The system of claim 10 wherein the mobile manager system further determines a status of at least one of the plurality of POS systems, identifies whether the status is satisfactory, and when the status is unsatisfactory, adjusts the status to reach a satisfactory level.

14. The system of claim 13 wherein the mobile manager system adjusts the status by remotely switching a status for a lock of the at least one POS system.

* * * * *